Sept. 3, 1940.  H. STUMPP  2,213,417
TORSIONAL-OSCILLATION DAMPER
Filed March 19, 1938
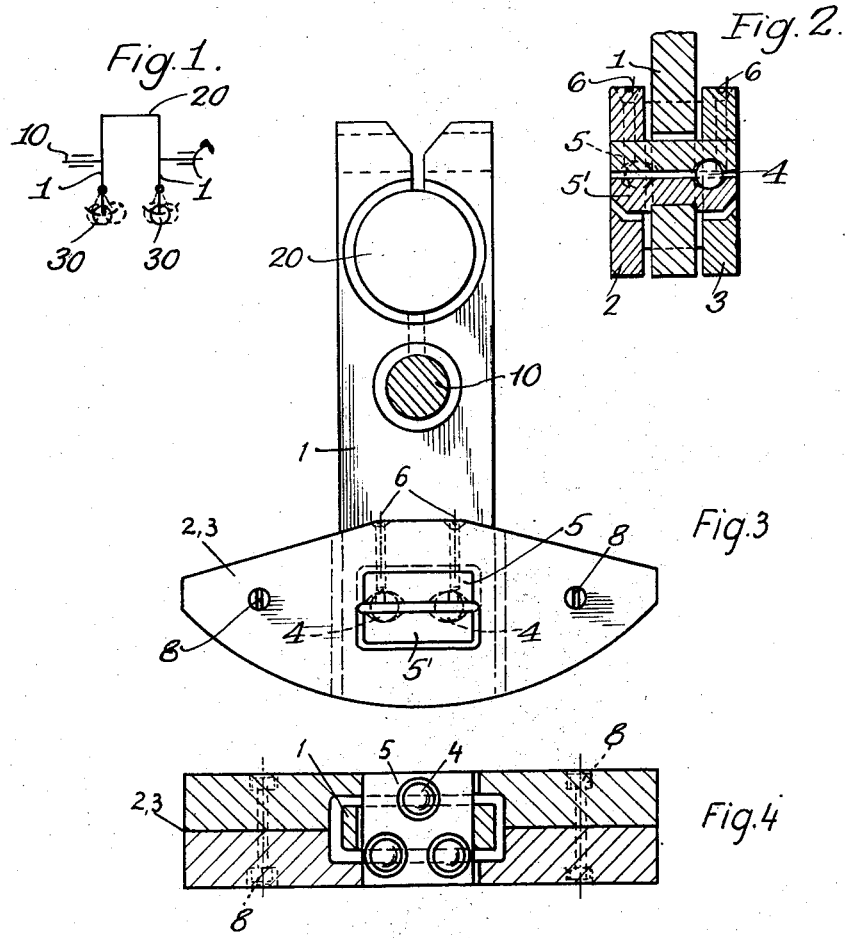
Inventor
Hermann Stumpp
by Knight Bro.
attorneys Patented Sept. 3, 1940

2,213,417

UNITED STATES PATENT OFFICE 2,213,417

TORSIONAL-OSCILLATION DAMPER

Hermann Stumpp, Berlin, Germany, assignor to Brandenburgische Motorenwerke Gesellschaft mit beschränkter Haftung, Berlin-Spandau, Germany, a corporation of Germany Application March 19, 1938, Serial No. 196,973
In Germany March 20, 1937

4 Claims. (Cl. 74—604)

My invention relates to means for damping torsional vibrations of a rotating shaft, in particular of a crank shaft. Such damping means comprise, as a rule, an arm radially extending from the rotary shaft, and a weight pendulously mounted on the arm.

An object of my invention is to improve damping means of the above-mentioned type so as to suppress not only torsional vibrations but also oscillations in other directions. Another object, in conjunction with the foregoing, is to obtain a suppression of torsional and transversal vibrations without giving cause to undesired and disturbing movements of the oscillatory weight.

According to the invention, the oscillatory mass or weight of a vibration damper of the type here in point is supported or suspended by means of three rolling bodies. In this manner not only the vibrations acting in the direction of rotation but also those acting in other directions are absorbed and reduced, without allowing the weight to effect undesired and disturbing movements. By tuning the frequency of oscillation to that of excitation it is possible to damp transverse and torsional oscillations with one and the same damping device, it being assumed that the frequency of excitation in the transverse direction is equal to that in the direction of rotation or that the same frequency is to be damped.

In the accompanying drawing are shown some embodiments of the invention in diagrammatic form.

Fig. 1 shows a one-throw crankshaft of a radial engine provided with oscillatingly suspended counterweights for preventing transverse oscillations.

Figs. 2 and 4 show sectional views of a counterweight designed as an oscillation damper and secured to the crank cheek, and Fig. 3 shows a lateral view thereof.

In Fig. 1 of the drawing, 10 designates a crank shaft, for instance of a radial engine for aircraft. 1 indicates two crank cheeks, and 30 two counterweights. 20 is the crank pin connecting the two cheeks 1.

The construction of the crank cheeks and counterweights, which in Fig. 1 are represented in a schematical manner, is shown in detail in Figs. 2, 3 and 4. Each counterweight proper consists of two parts 2 and 3 which are held together by bolts 8 and suspended on the crank cheek 1. To this end, three balls 4 serve as a bearing, the balls cooperating with ball sockets arranged in two bearing plates 5 and 5' passing through the counterweight 2, 3 and the crank cheek 1. The radius of the ball sockets is so much greater than the radius of the balls as is required by the desired frequency of oscillation. In order to enable the counterweight 2, 3 to oscillate in every direction there is a clearance between the lower bearing plate 5' secured to the crank cheek 1 and the counterweight 23 surrounding the plate. A similar clearance is provided between the upper bearing plate 5 and the crank cheek 1. The bearing plate 5 is firmly secured to the counterweight 2, 3, for instance, by means of screws 6.

A device according to the invention permits the counterweight to effect pendulous oscillations in the direction of the rotation as well as in any other direction in, or parallel to, the plane of illustration of Fig. 4. Undesired radial vibrations or tilting movements of the weight relative to the cheek, however, are securely prevented with a minimum of constructional means and space requirement.

What is claimed is:

1. In combination with a rotating body, a device for simultaneously damping torsional and bending oscillations of said body, comprising a counterweight member, and a single group of three equally spaced balls arranged between said body and said counterweight, said body and said counterweight having opposite seats engaging said balls, said seats having a curvature smaller in said two planes than that of said balls so as to allow said counterweight pendulous movements relative to said body in the plane of rotation as well as in an axial plane of said body.

2. In combination with a rotary shaft, a device for simultaneously damping torsional and transversal vibrations of said shaft, comprising a radial member extending from said shaft, a counterweight surrounding said member with sufficient clearance in the plane of rotation and in an axial plane of said shaft to allow said counterweight pendulous motions relative to said member in said two planes, and a single group of three equally spaced balls arranged between said member and said counterweight so as to engage opposite bearing surfaces of said member and said counterweight, said bearing surfaces being designed to permit said balls relative movements in said two planes.

3. In combination with a crank shaft, means for simultaneously damping torsional and transversal vibrations of said shaft, said means comprising a crank arm firmly mounted on said shaft, a counterweight surrounding said crank arm with clearance in the tangential direction and in the axial direction relative to said shaft, and three balls arranged between said arm and said counterweight, spaced from one another so as to determine a tangential plane relative to said shaft, said member and said counterweight having opposite seats engaged by said balls, said seats having a curvature smaller in said tangential and axial directions than the curvature of said balls.

4. In combination with a crank shaft, means for simultaneously damping torsional and transversal vibrations of said shaft, said means comprising a crank arm firmly mounted on said shaft and having an opening in its end portion, a counterweight surrounding said end portion of said arm having an opening substantially in registry with said opening of said arm, an inner plate and an outer plate arranged in tangential direction with respect to said shaft and traversing said openings, said inner plate being firmly connected with said counterweight, said outer plate being firmly connected with said arm, and three balls arranged between said plates and spaced from one another so as to determine a tangential plane relative to said shaft, said plates having spherical seats engaging said balls and having a larger radius than said balls so as to allow said counterweight pendulous movements relative to said body in the plane of rotation as well as in an axial plane of said shaft, said seats being arranged in a triangle extending on both sides beyond the cross section of said arm.

HERMANN STUMPP.